(12) United States Patent
Estes

(10) Patent No.: US 8,690,652 B1
(45) Date of Patent: Apr. 8, 2014

(54) LONGITUDINALLY NOTCHED THRESHING ELEMENT FOR AN AGRICULTURAL COMBINE THRESHING CONCAVE

(71) Applicant: Donald J. Estes, Frankfort, IN (US)

(72) Inventor: Donald J. Estes, Frankfort, IN (US)

( * ) Notice: Subject to any disclaimer, the term of this patent is extended or adjusted under 35 U.S.C. 154(b) by 0 days.

(21) Appl. No.: 13/986,743

(22) Filed: May 31, 2013

Related U.S. Application Data

(63) Continuation of application No. 13/573,046, filed on Aug. 15, 2012, now Pat. No. 8,454,416.

(51) Int. Cl.
*A01F 12/24* (2006.01)

(52) U.S. Cl.
USPC .......................................... 460/110; 460/107

(58) Field of Classification Search
USPC ................ 428/34.1; D25/119; 460/110, 107;
D15/28, 10; 241/88.4, 101.742, 89.1,
241/102, 222
See application file for complete search history.

(56) References Cited

U.S. PATENT DOCUMENTS

| | | | |
|---|---|---|---|
| D28,863 S * | 6/1898 | Baker | D25/119 |
| 773,664 A | 11/1904 | More | |
| 1,421,459 A * | 7/1922 | Gritzmacher | 460/31 |
| 1,570,898 A | 1/1926 | Landis | |
| 1,778,664 A * | 10/1930 | Dragon | 126/152 R |
| 2,321,019 A | 6/1934 | Dray | |
| 1,970,797 A | 8/1934 | Coultas | |
| 2,457,680 A * | 12/1948 | Johnson | 460/110 |
| 2,484,228 A | 10/1949 | Isay | |
| 2,569,175 A | 9/1951 | Karlsson | |
| 2,768,626 A | 10/1956 | Pelowski | |
| 2,863,551 A | 12/1958 | Bilocq | |
| 3,115,087 A | 12/1963 | Ginaven | |
| 3,378,985 A | 4/1968 | Bugan | |
| 3,515,145 A | 6/1970 | Herbsthofer | |
| 3,678,938 A | 7/1972 | De Coene | |
| 3,946,746 A | 3/1976 | Decoene et al. | |
| 4,075,823 A | 2/1978 | Rowland-Hill | |
| 4,192,322 A * | 3/1980 | Wilson | 460/70 |
| 4,378,024 A | 3/1983 | De Busscher et al. | |
| 4,383,652 A | 5/1983 | Osborne et al. | |
| 4,495,954 A * | 1/1985 | Yarbrough | 460/107 |
| 4,497,328 A | 2/1985 | Alm et al. | |
| RE31,860 E | 4/1985 | Decoene et al. | |
| 4,606,355 A | 8/1986 | Dammann | |
| 4,807,645 A * | 2/1989 | Mietzel et al. | 460/32 |
| 4,875,891 A | 10/1989 | Turner et al. | |
| 4,909,772 A | 3/1990 | Kuchar | |
| 4,919,641 A * | 4/1990 | Yarmashev et al. | 460/69 |
| 4,953,718 A * | 9/1990 | Graff et al. | 211/123 |
| 5,024,631 A | 6/1991 | Heidjann et al. | |

(Continued)

FOREIGN PATENT DOCUMENTS

DE 3303413 A1 8/1984
JP 2011057427 A 3/2011

*Primary Examiner* — Arpád Fábián-Kovács
(74) *Attorney, Agent, or Firm* — John R. Flanagan

(57) ABSTRACT

A concave includes a frame and an array of threshing elements supported by the frame, the threshing elements being spaced apart and extending generally parallel to one another. The threshing elements are configured in the form of round bars each having formed on an upper portion thereof disposed adjacent to an upper portion of the frame a longitudinally-extending notch respectively defining an aggressive threshing edge. The spaced apart relationship and round configuration of the threshing elements reduce plugging of the concave. The threshing edges facing in a direction opposite to the direction of crop material flow restrict crop material flow and thereby enable more effective threshing.

1 Claim, 5 Drawing Sheets

(56) References Cited

U.S. PATENT DOCUMENTS

| | | |
|---|---|---|
| 5,057,056 A | 10/1991 | Kambeitz |
| 5,200,240 A * | 4/1993 | Baker .................. 428/34.1 |
| 5,451,184 A * | 9/1995 | Mietzel .................. 460/32 |
| 5,489,239 A | 2/1996 | Matousek et al. |
| 5,569,080 A | 10/1996 | Estes |
| 5,613,907 A | 3/1997 | Harden |
| 5,816,911 A | 10/1998 | Dwyer |
| 6,036,598 A | 3/2000 | Harden et al. |
| 6,074,297 A | 6/2000 | Kuchar |
| 6,193,604 B1 | 2/2001 | Ramp et al. |
| 6,251,008 B1 | 6/2001 | Mietzel |
| 6,358,142 B1 | 3/2002 | Imel et al. |
| 6,447,394 B1 | 9/2002 | Gryspeerdt |
| 6,485,364 B1 | 11/2002 | Gryspeerdt et al. |
| 6,503,142 B2 | 1/2003 | Imel et al. |
| 6,537,148 B2 | 3/2003 | Schwersmann |
| 7,166,026 B2 | 1/2007 | Ricketts et al. |
| 7,285,043 B2 | 10/2007 | Foster et al. |
| 7,749,055 B2 | 7/2010 | Ricketts |
| D624,939 S | 10/2010 | Flickinger et al. |
| 7,934,274 B2 * | 5/2011 | Forrest et al. .................. 4/576.1 |
| 8,523,126 B2 * | 9/2013 | Garrels et al. ........... 248/222.14 |
| 2005/0197176 A1 | 9/2005 | Foster et al. |
| 2009/0205124 A1 * | 8/2009 | Forrest et al. .................. 4/576.1 |
| 2012/0177317 A1 | 7/2012 | Hoffmann et al. |

* cited by examiner

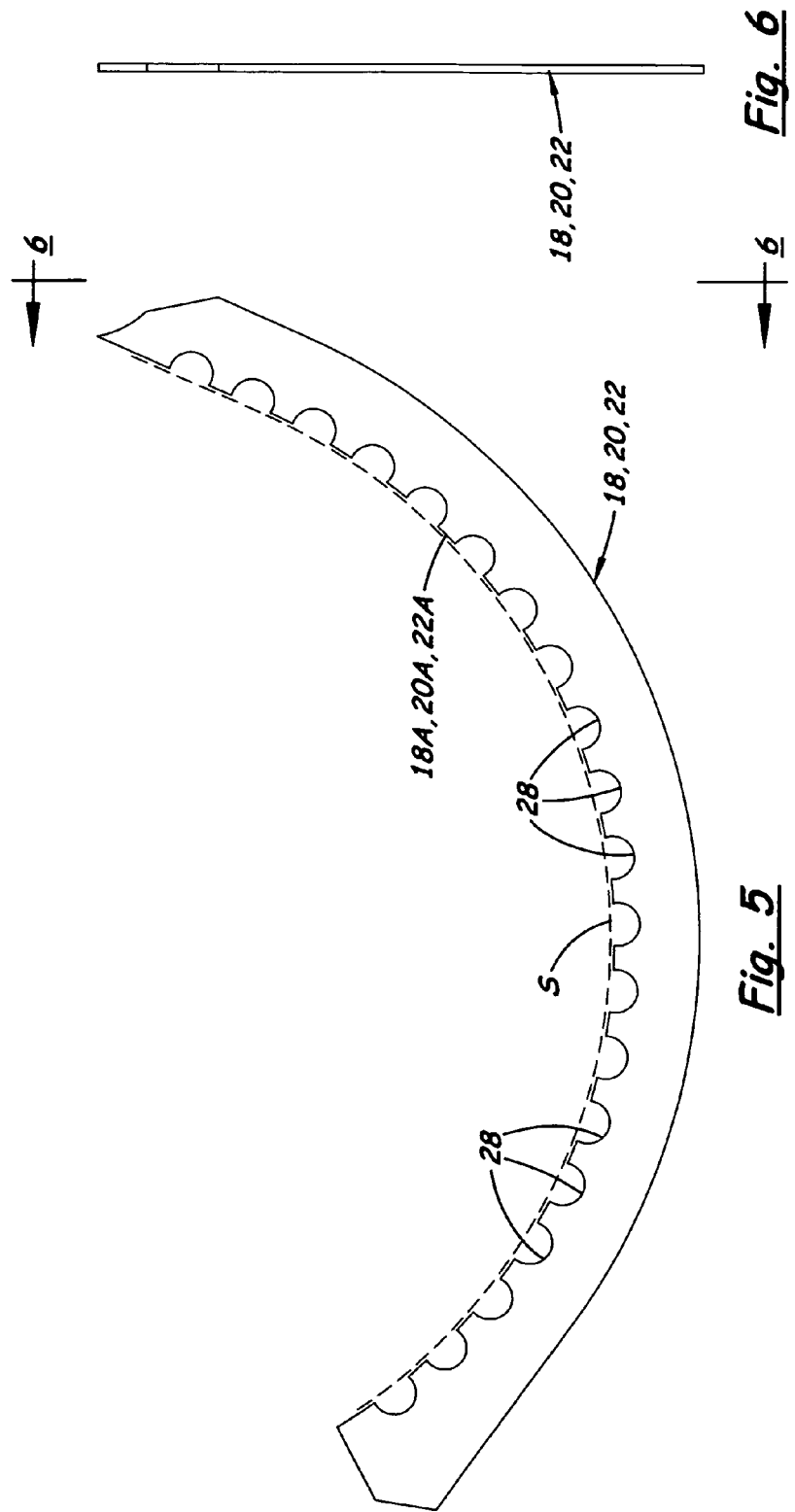

LONGITUDINALLY NOTCHED THRESHING ELEMENT FOR AN AGRICULTURAL COMBINE THRESHING CONCAVE

This patent application is a continuation of U.S. application Ser. No. 13/573,046 filed Aug. 15, 2012 (projected to issue as U.S. Pat. No. 8,454,416 on Jun. 4, 2013), which claims the benefit of U.S. Provisional Application No. 61/573,644 filed Sep. 9, 2011. Each application identified above is hereby incorporated by reference in its entirety to provide continuity of disclosure.

BACKGROUND OF THE INVENTION

1. Field of the Invention

The present invention generally relates to a concave for an agricultural combine and, more particularly, is concerned with a longitudinally notched threshing element for an agricultural combine threshing concave.

2. Description of the Prior Art

Rotary combines have a rotary crop processing unit that threshes and separates the grain from the harvested crop material. The rotary crop processing unit is formed by a rotor radially surrounded by a casing. The rotor and casing together define an inlet section, a threshing section and a separating section. As disclosed in U.S. Pat. No. 6,193,604 to Ramp et al., the bottom of the casing has a concave under the threshing section for threshing the crop material and a separating grate under the separator section for separating the grain from the threshed crop material. The inlet section pulls the harvested crop material from a front crop gathering unit into the threshing section. The threshing section threshes the crop material and then feeds the threshed crop material to the separator section.

As shown in the Ramp et al. patent, the concave is provided with a combination of threshing elements in the form of straight bars square in cross-section that are spaced apart from one another with wires between the bars. The objective of this combination is to restrict the flow of crop material so as to enhance threshing of the crop material in the threshing section. However, under corn crop conditions, a tendency frequently develops for crop material flow to be restricted too much by corn shucks getting hung up on the bars and catching on the wires, resulting in plugging of the concave. One solution tried thus far has been to change the threshing elements of the concave to round bars with no wires. But now a tendency frequently develops under some crop conditions, other than corn, for too little restriction of crop material flow such that the other crop materials are not threshed effectively, resulting in overloading of the separator section.

Consequently, a need remains for innovation that will provide a solution to the aforementioned problems.

SUMMARY OF THE INVENTION

The present invention provides a threshing element for the concave designed to overcome the above-described drawbacks and satisfy the aforementioned need. The concave incorporates an array of spaced apart threshing elements in the form of round bars that have longitudinal notches formed on their upper portions respectively defining aggressive threshing edges. The round configuration of the spaced apart bars reduces plugging of the concave as the threshing edges of the longitudinal notches, facing in a direction opposite to the direction of crop material flow, restrict crop material flow and thereby enable more effective threshing.

Accordingly, the present invention is directed to threshing element for an agricultural combine threshing concave. The threshing element is an elongated bar being round in cross-sectional configuration and straight in longitudinal extent between opposite ends of the bar. The bar has a notch formed therein extending longitudinally between the opposite ends of the bar and defining an aggressive threshing edge recessed into the bar such that the threshing edge is adapted to face opposite to the direction of crop material flow relative to the threshing concave.

The present invention is also directed to an array of threshing elements in an agricultural combine concave. The array of threshing elements is an array of elongated threshing bars spaced apart and extending generally parallel to one another. Each of the bars is straight in longitudinal extent and round in cross-sectional configuration. Each bar has a lower portion, an upper portion, and a notch defining an aggressive threshing edge recessed into the bar adjacent to the upper portion of the bar and above the lower portion of the bar. The notch extends longitudinally between opposite ends of the bar such that the threshing edge is adapted to face opposite to the direction of crop material flow relative to the threshing concave.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 5 is an enlarged end elevational view of a representative one of a pair of opposite end frame members and an intermediate frame member of the concave of FIGS. 1-3 showing one configuration of openings formed in the frame members for seating the array of threshing elements as shown in FIG. 7.

FIG. 6 is a side elevational view of the one end member of the concave as seen along line 6-6 in FIG. 5.

DETAILED DESCRIPTION OF THE INVENTION

Figure 8:
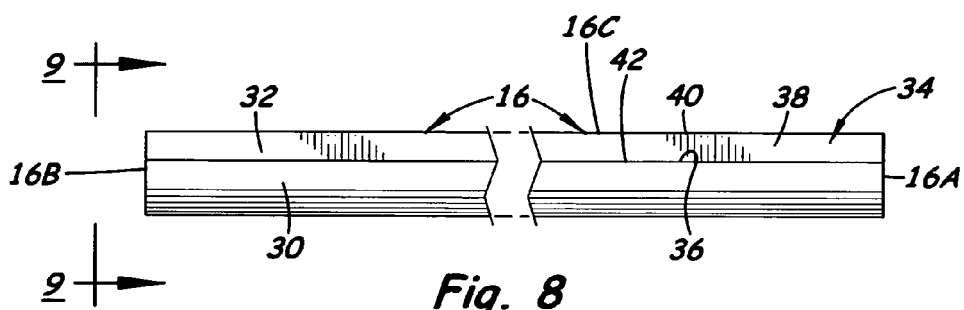
FIG. 8 is an enlarged foreshortened front elevational view of one of the threshing elements of the concave.
Figure 9:
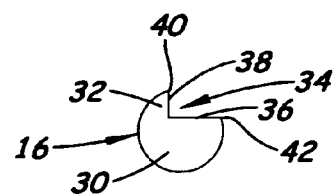
FIG. 9 is an end elevational view of the one threshing element as seen along line 9-9 in FIG. 8.

Referring to the drawings, and particularly to FIGS. 1-4, there is illustrated an exemplary embodiment of a threshing concave, generally designated 10, employing elongated threshing elements 16 having a construction in accordance with the present invention. The concave 10 includes a frame 12 and an array 14 of elongated threshing elements 16 supported by the frame 12. Each of the threshing elements 16, as best seen in FIGS. 8 and 9, has a cross-sectional configuration in accordance with the present invention. The components of the concave 10 are made of a suitable substantially rigid material, such as steel.

More particularly, referring now to FIGS. 1-6, the frame 12 is formed by opposite end members 18, 20, an intermediate member 22 and opposite side members 24, 26. The opposite end members 18, 20, being of substantially identical configuration, are spaced apart from one another and extend generally parallel to one another. The end members 18, 20 and intermediate member 22, as seen particularly in FIGS. 5 and 6, are in the form of relatively thin elongated plates. The intermediate member 22 is spaced substantially equidistantly between the end members 18, 20 and extends generally parallel thereto. The end and intermediate members 18, 20, 22 together are similarly curved in configuration and have respective inner top edges 18A, 20A, 22A which lie along a common surface S of curved shape that is spaced from and extend circumferentially about a portion of a rotor of a crop material harvesting machine, the rotary combine, when the concave 10 is installed in the combine. The end and intermediate members 18, 20, 22 each has a plurality of openings, more particularly, in configurations of slots or recesses 28, spaced apart from one another and formed in the upper portions of each of the end and intermediate members 18, 20, 22, below and open at their inner top edges 18A, 20A, 22A, such that the spaced apart openings formed in one opposite end member 18 respectively correspond with the spaced apart openings formed in the other opposite end member 20 and the intermediate member 22.

The side members 24, 26 of the frame 12 are spaced from one another and extend generally parallel to one another. The side members 24, 26 also extend transversely between and are rigidly joined to corresponding ends of the curved end and intermediate members 18, 20, 22. The side members 24, 26 are straight in configuration for supporting the frame 12 as part of the casing (not shown) below the rotor (not shown) of the combine.

Figure 7:
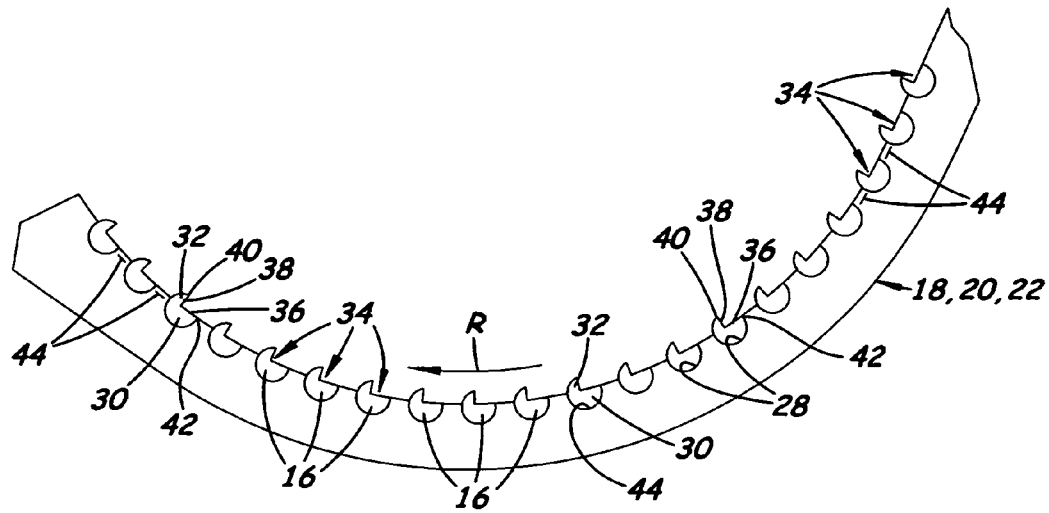
FIG. 7 is an end elevational view of the one end member of the concave as shown in FIG. 5 now also showing the ends of the arrayed threshing elements seatably mounted to the one end member.

Referring now to FIGS. 7-9, the array 14 of elongated threshing elements 16 supported by the frame 12 take the form of a plurality of elongated longitudinally-notched spaced-apart bars 16 supported by the frame 12. The bars 16 are straight in longitudinal extent and round in cross-section, and extend between the opposite end members 18, 20 past the intermediate member 22 of the frame 12. The bars 16 are spaced apart from and extend generally parallel to one another. At their opposite end portions 16A, 16B and an intermediate portion 16C, the bars 16 are seated in the shape-conforming concave slots or recesses 28 formed in the end and intermediate members 18, 20, 22 of the frame 12. Further, the bars 16, at their opposite ends 16A, 16B and intermediate portion 16C, are affixed, using any suitable technique, such as by welding, to the end and intermediate members 18, 20, 22 of the frame 12.

Figure 1:
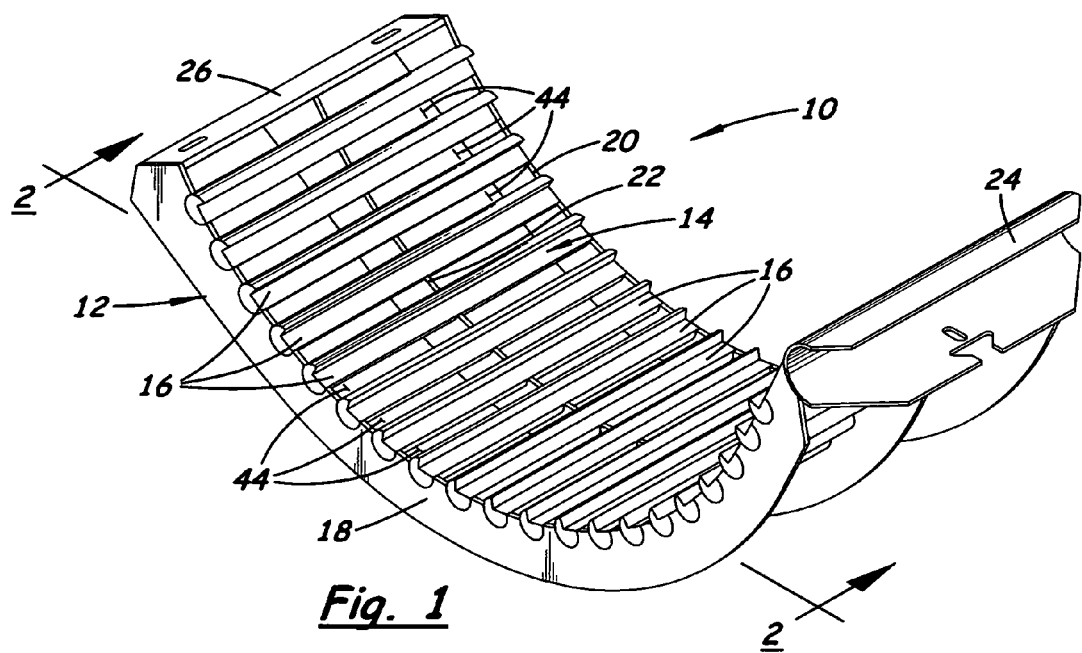
FIG. 1 is a perspective view of an exemplary embodiment of a threshing concave incorporating an array of longitudinally notched spaced apart threshing elements in accordance with the present invention.
Figure 4:
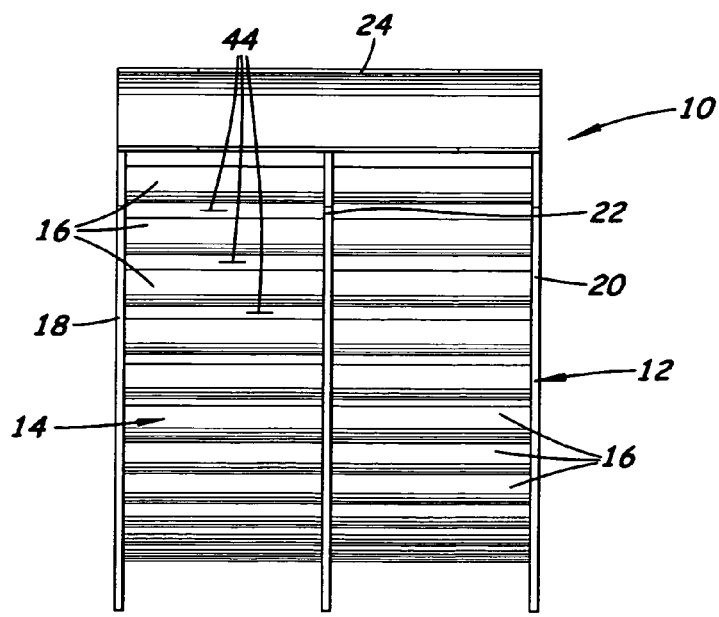
FIG. 4 is a side elevational view of the concave as seen along line 4-4 in FIG. 2.
Figure 2:
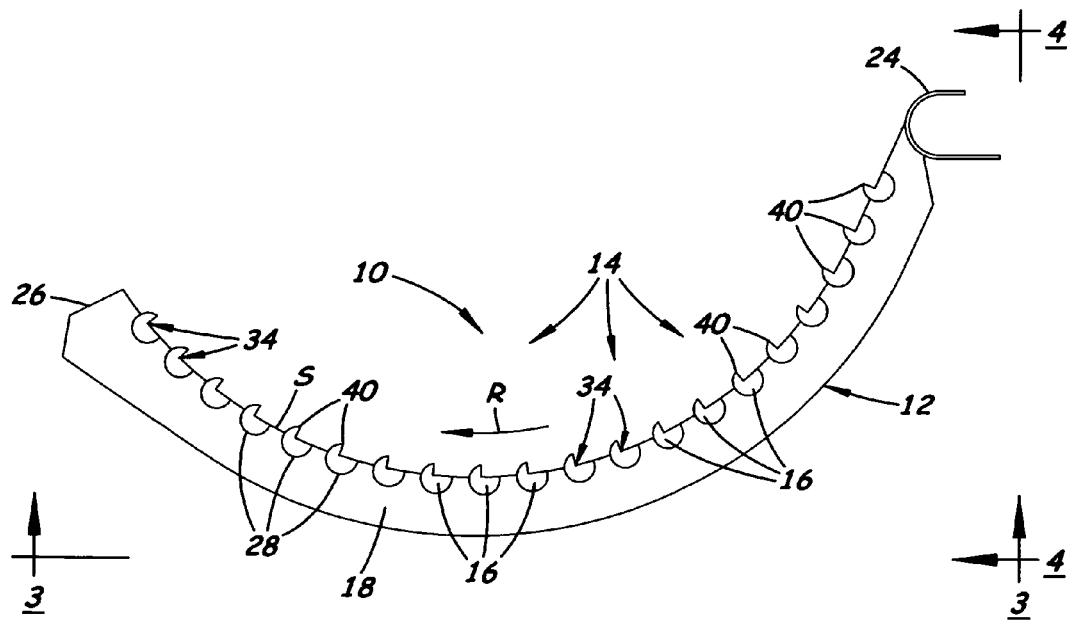
FIG. 2 is an end elevational view of the concave as seen along line 2-2 in FIG. 1.
Figure 3:
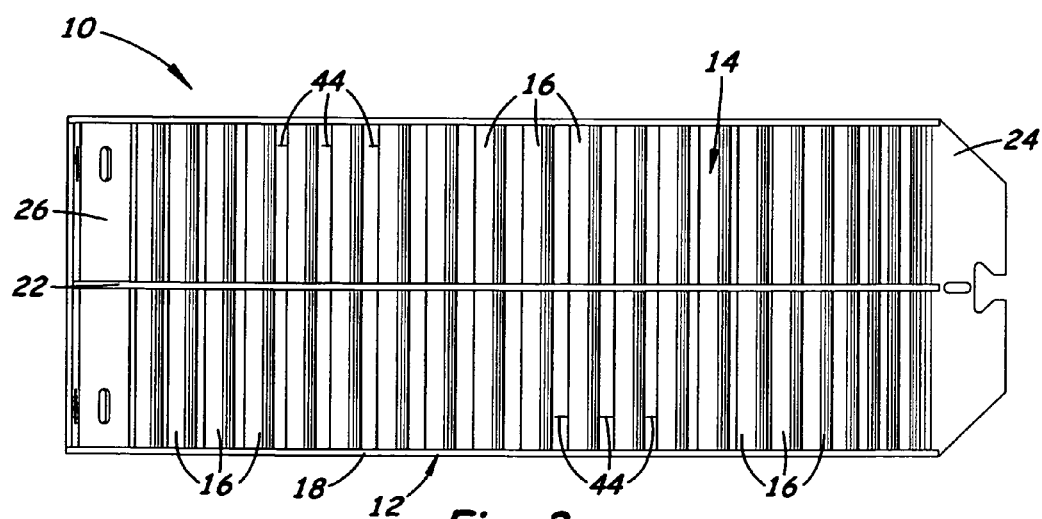
FIG. 3 is a bottom plan view of the concave as seen along line 3-3 in FIG. 2.

More particularly, each elongated bar 16 has a lower portion 30, an upper portion 32 and a longitudinally-extending notch 34. (The notches 34 are also shown in FIGS. 1, 2.) The lower portion 30 of each bar 16 has about a semi- or half-cylindrical rounded configuration in cross-section. The lower portion 30 is seated in the shape-conforming concave slots or recesses 28 spaced apart from one another and formed in the frame end and intermediate members 18, 20, 22 below and open at their inner top edges 18A, 20A, 22A. The upper portion 32 of each bar 16 has about a quarter-cylindrical rounded configuration in cross-section. The upper portion 32 merges from the lower portion 30 and extends above the lower portion 30 and the inner top edges 18A, 20A, 22A of the end and intermediate members 18, 20, 22 of the frame 12. Thus, the depths of the recesses 28 into frame members 18, 20, 22 are such that the notches 34 of the bars 16 seated in the recesses 28 are disposed substantially above the top edges 18A, 20A, 22A of the frame members 18, 20, 22.

The longitudinally-extending notch 34 in the bar 16 is defined by first and second surfaces 36, 38 formed on the bar 16 and disposed in a transverse relation to one another, for example through an angle of about 90°. The first surface 36 lies on the lower portion 30 of the bar 16, extending longitudinally along the bar 16 between the opposite end portions 16A, 16B of the bar, forwardly of the upper portion 32 and above the lower portion 30 of the bar 16. The first surface 36 on the lower portion 30 of the bar 16 is generally coextensive with the common surface S of curved configuration in which lie the inner top edges 18A, 20A, 22A of the end and intermediate members 18, 20, 22 of the frame 12. The second surface 38 lies on the upper portion 32 of the bar 16, extending upright from and in the transverse relation to the first surface 36, above the inner top edges 18A, 20A, 22A of the end and intermediate members 18, 20, 22 of the frame 12 and toward the rotor of the crop material harvesting machine. The second surface 38 faces in a direction opposite to the direction of rotation R of the rotor relative to the frame 12 such that second surface 38 defines an exposed forward-facing relatively aggressive threshing edge 40 on the bar 16 for restricting the flow of crop material over and past the bar 16 while the first surface 36 defines an exposed upward-facing edge 42 on the bar 16 for restricting the flow of crop material outwardly through the spaces 44 between the bars 16. Although not shown in FIGS. 2, 5 and 7 in order to simplify illustration of the concave 10, the space 44 between the recesses 28 and thus between the seated bars 16 preferably progressively increase in width or are more open going from one of the side members 24 of the frame 12 to the other side member 26 in the direction of rotation R of the rotor relative to the frame 12 to aid in removing crop material sooner to avoid overloading the following separator section of the casing.

By way of example, not as a limitation, the widths of the spaces 44 may increase from the smallest of about 0.875 inch to the largest of about 1.25 inches. The length of the bars 16 may be about 13.75+/−0.03 inches. The diameter of the bars 16 may be about 1 inch. The width of the first surface 36 may be about 0.625 inch. The width of the second surface 38 may be about 0.375 inch. The radius of the recesses 28 may be slightly greater than 0.5 inch in order to accommodate the bars 16 each having the 0.5 inch radius.

Figures 10, 11:
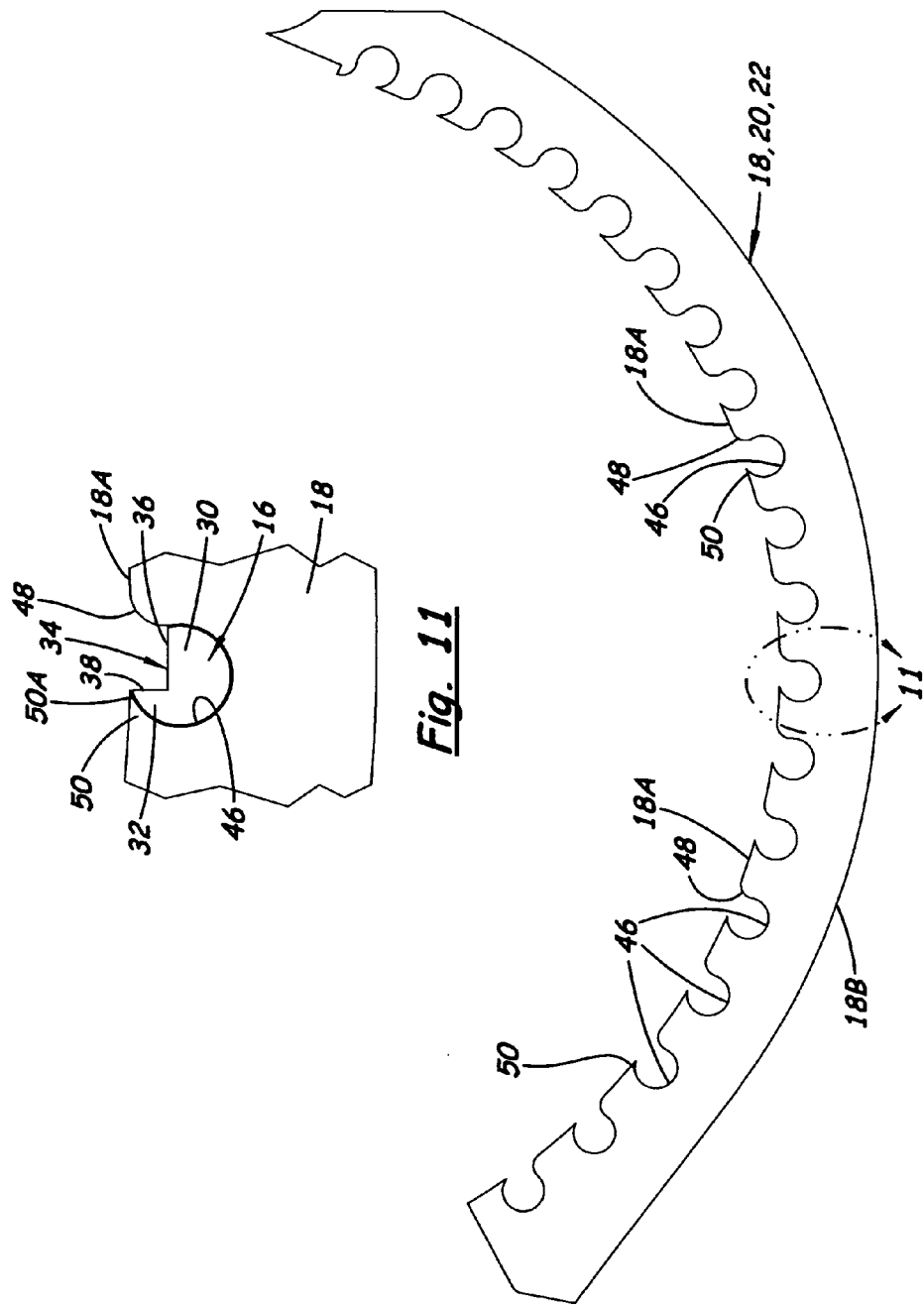
FIG. 10 is an enlarged end elevational view of the same frame member as that shown in FIG. 5 but now having openings of a modified configuration formed in the frame member in place of configurations of the openings shown in FIG. 5.
FIG. 11 is an enlarged view of a fragmentary portion of the frame member enclosed by the dashed circle 11 in FIG. 10 now also showing an end view of a threshing element seated

Referring now to FIGS. 10 and 11, there is shown the same representative one frame member 18, of the frame members 18, 20, 22, as that shown in FIG. 5. Now the frame member 18 (and likewise in the case of the other frame members 20, 22) has a plurality of openings formed therein, more particularly, with modified configurations in the form of substantially circular shaped holes 46 in place of the semi-circular shaped recesses 28 shown in FIG. 5. The holes 46, having the same radius as the recesses 28, are displaced, by way of example, approximately three-eighths inch closer to the bottom edge 18B of the frame member 18 than were the recesses 28. Further, the upper portions of the frame member 18 at the right sides of the holes 46 have rounded configurations that merge with the top edge 18A so as to provide the frame member 18 with rounded edge segments 48 that extend between the holes 46 and the top edge 18A and that are opposite from pointed edge segments 50 on the upper portions of the frame member 18A on the left side of the holes 46 which pointed edge segments 50 backstop the portions of the rods 16 seated in the holes 46, as shown in the case of the representative one rod 16 in FIG. 11. The second surface 38 of the notch 34 on the upper portion 32 of the bar 16 is generally aligned vertically with the tip 50A of the pointed edge segment 50. As also shown in FIG. 10, the center-to-center distances between the holes 46, and thus the widths of the spaces between the rods 16 seated therein, preferably progressively increase going from right to left as seen in FIG. 10. By way of example, not as a limitation, the center-to-center distances may increase from the smallest of about 1.75 inch to the largest of about 2.34 inches. There are nineteen holes 46 and thus the same number of seated bars 16 in the frame member 18 shown in FIG. 10 versus twenty recesses 38 and thus the same number of seated bars 16 in the frame member 18 shown in FIG. 5. Because of the greater depth of the holes 46 from the top edge 18A into the frame member 18 (and likewise in the case of the other frame members 20, 22), the notches 34 of the bars 16 seated in holes 46 are disposed substantially below the top edge 18*a* of the frame member 18.

It is thought that the present invention and its advantages will be understood from the foregoing description and it will be apparent that various changes may be made thereto without departing from the spirit and scope of the invention or sacrificing all of its material advantages, the forms hereinbefore described being merely exemplary embodiments thereof.

What is claimed is:

1. A crop material threshing apparatus for an agricultural combine, comprising:
   a threshing concave having a plurality of elongated threshing bars;
   each of said threshing bars being spaced apart from one another, extending generally parallel to one another, and also being straight in longitudinal extent between opposite ends of said each bar; and
   each of said threshing bars further being round in cross-sectional configuration and having
   a notch formed therein,
   an upper portion of quarter-cylindrical configuration in cross-section, and
   a lower portion of semi-circular configuration in cross-section and underlying said upper portion such that said upper portion merges from and extends upwardly from said lower portion with said notch located adjacent to said upper portion and above said lower portion;
   said notch in said each bar being defined by
   a first surface formed on said lower portion and extending away from said upper portion, and
   a second surface formed on said upper portion and extending upright from and in transverse relation to said first surface, said first and second surfaces extending longitudinally between said opposite ends of said each bar such that said second surface on said upper portion provides an aggressive threshing edge recessed into said bar, extending between said opposite ends of said each bar and facing opposite to the direction of crop material flow relative to said threshing concave.

* * * * *